United States Patent [19]

Kurosawa

[11] Patent Number: 5,202,797
[45] Date of Patent: Apr. 13, 1993

[54] DISK DRIVE DEVICE HAVING A SINGLE MOTOR FOR ROTATING A PLURALITY OF DISKS

[75] Inventor: Yuichi Kurosawa, Tokyo, Japan

[73] Assignee: Asahi Kogaku Kogyo Kabushiki Kaisha, Tokyo, Japan

[21] Appl. No.: 584,111

[22] Filed: Sep. 18, 1990

[30] Foreign Application Priority Data

Sep. 22, 1989 [JP] Japan .................. 1-247105

[51] Int. Cl.$^5$ .......................... G11B 5/86; G11B 19/00
[52] U.S. Cl. ................... 360/15; 360/98.01; 360/98.07; 369/197; 369/266; 369/269
[58] Field of Search ............ 369/34, 35, 36, 37, 369/38, 197, 198, 266, 269; 360/92, 15, 98.07, 98.01; 384/112, 113, 114, 115

[56] References Cited

U.S. PATENT DOCUMENTS

| | | | |
|---|---|---|---|
| 1,442,640 | 1/1923 | Bracken | 369/197 |
| 1,885,005 | 10/1932 | Daily | 369/197 |
| 1,918,588 | 7/1933 | Bryant | 369/197 |
| 3,519,762 | 7/1970 | Morris | 360/15 |
| 3,824,572 | 7/1974 | Morehouse | 340/174.1 C |
| 4,346,946 | 8/1982 | Maruyama | 308/9 |
| 4,375,655 | 3/1983 | Korth et al. | 360/15 |
| 4,506,304 | 3/1985 | Harvey | 360/15 |
| 4,547,081 | 10/1985 | Tanaka et al. | 384/107 |
| 4,679,100 | 7/1987 | Yokota | 360/15 |
| 4,781,476 | 11/1988 | Uhen | 384/136 |
| 4,892,418 | 1/1990 | Asada et al. | 384/112 X |

FOREIGN PATENT DOCUMENTS

| | | | |
|---|---|---|---|
| 817214 | 7/1949 | Fed. Rep. of Germany | 369/198 |
| 59-188350 | 10/1984 | Japan . | |
| 63756 | 4/1985 | Japan | 360/15 |
| 200589 | 9/1987 | Japan | 360/15 |
| 39136 | 2/1988 | Japan | 360/15 |
| 522538 | 6/1940 | United Kingdom . | |
| 1524662 | 9/1978 | United Kingdom . | |
| 2228358 | 8/1990 | United Kingdom . | |

OTHER PUBLICATIONS

English Patent Abstract for Japanese Application No. 59-188350.

Primary Examiner—John W. Shepperd
Attorney, Agent, or Firm—Sandler Greenblum & Bernstein

[57] ABSTRACT

A disk drive device is disclosed including a supporting mechanism for supporting a plurality of magnetic disks, a single motor, and a transmitting mechanism. The supporting mechanism comprises a plurality of bearing mechanisms, each of which rotatably supports each of the magnetic disks, respectively. Each bearing mechanisms is formed as a tube, and a rotatable shaft is connected to each disk and rotatably supported in each tubular bearing mechanism. The rotatable shaft is provided with grooves which generate a pumping effect when a fluid is passed therethrough, whereby the rotatable shaft is supported in the tubular bearing mechanism without friction therebetween. The transmitting mechanism comprises an endless belt for transmitting a rotation of the motor to the supporting mechanism.

7 Claims, 4 Drawing Sheets

Fig. 3
Fig. 4
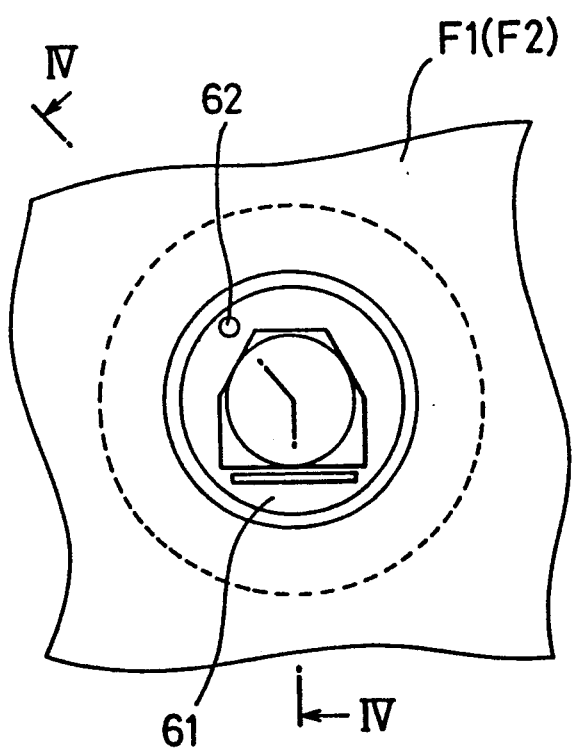
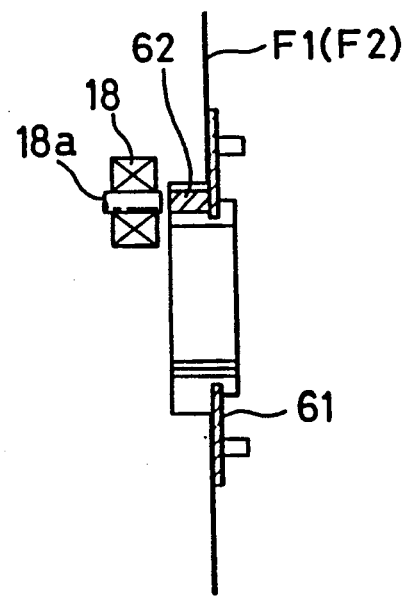

DISK DRIVE DEVICE HAVING A SINGLE MOTOR FOR ROTATING A PLURALITY OF DISKS

BACKGROUND OF THE INVENTION

1. Field of the Invention

The present invention relates to a disk drive device which can be utilized in a unit used for dubbing video signals recorded on one magnetic disk onto other magnetic disks.

2. Description of the Related Art

Electronic still cameras have become increasingly popular. The electronic still camera uses a magnetic disk, called a floppy disk, as the recording medium thereof, and is constructed in such a manner that video signals corresponding to one frame or one field are recorded on two tracks or one track of the magnetic disk, respectively. Video signals already recorded on a magnetic disk can be dubbed onto other magnetic disks.

A conventional dubbing unit has, for example, two spindle chucks for holding two magnetic disks; one disk having video signals recorded thereon, and the other provided for recording the video signals thereon from the first-mentioned magnetic disk. Each spindle chuck is driven by a spindle motor, respectively; the two spindle motors being controlled in synchronization with each other.

Such a conventional unit, however, requires two spindle motors, as described above, and therefore, the unit has a drawback in that the cost thereof is high and the thickness of the unit is large. Further, the rotational and mechanical precision of each spindle motor are to stable due to imprecision of a bearing supporting a motor of the spindle motor, and irregularities in the rotation of each spindle motor appear; thus an image quality is reduced due to jitter.

SUMMARY OF THE INVENTION

Therefore, an object of the present invention is to provide a disk drive device at a reduced cost, which allows the dubbing unit to be formed in a compact, thin manner and further a disk drive device which ensures little deterioration of an image quality caused by jitter.

According to the present invention, there is provided a disk drive device comprising a supporting mechanism for supporting a plurality of disks, a single motor, and a transmitting mechanism. The supporting mechanism includes a plurality of bearing mechanism each of which rotatably supports each of the disks, respectively, and the transmitting mechanism transmits a rotation of the motor to the supporting mechanism.

Further, according to the present invention, there is provided a disk drive device comprising a plurality of spindle chucks for holding each of the disks, respectively, a plurality of bearing mechanisms, a single motor, and a transmitting mechanism. The bearing mechanisms are provided for rotatably supporting each of the spindle chucks, respectively, and the transmitting mechanism is provided for transmitting a rotational of the motor to the spindle chucks.

Still further, according to the present invention, there is provided a disk drive device comprising a plurality of spindle chucks for rotating each of the disks, respectively, a plurality of bearing mechanisms, a single motor, and a transmitting mechanism. The bearing mechanisms are provided for rotatably supporting each of the spindle chucks, respectively, and generate a dynamic pressure by which the spindle chucks are rotatably supported. The transmitting mechanism is provided for transmitting a rotation of the motor to the spindle chucks.

Further, according to the present invention, there is provided a device for dubbing signals recorded on a first magnetic disk onto a second magnetic disk. The dubbing device comprises a supporting mechanism for supporting the first and second disks, a single motor, a transmitting mechanism, a reproducing mechanism, and an inputting mechanism. The supporting mechanism includes a plurality of bearing mechanisms which respectively and individually rotatably support the first and second disks. The transmitting mechanism transmits a rotation of the motor to the supporting mechanism. The reproducing mechanism reproduces signals recorded on the first magnetic disk. The inputting mechanism inputs the reproduced signals to the second magnetic disk.

BRIEF DESCRIPTION OF THE DRAWINGS

The present invention will be better understood from the description of the preferred embodiments of the invention set forth below, together with the accompanying drawings, in which:

FIG. 3 is a plane view showing the central portion of the magnetic disk;

FIG. 4 is a sectional view taken along the line IV—IV line of FIG. 3; and

DESCRIPTION OF THE PREFERRED EMBODIMENTS

Figure 1:
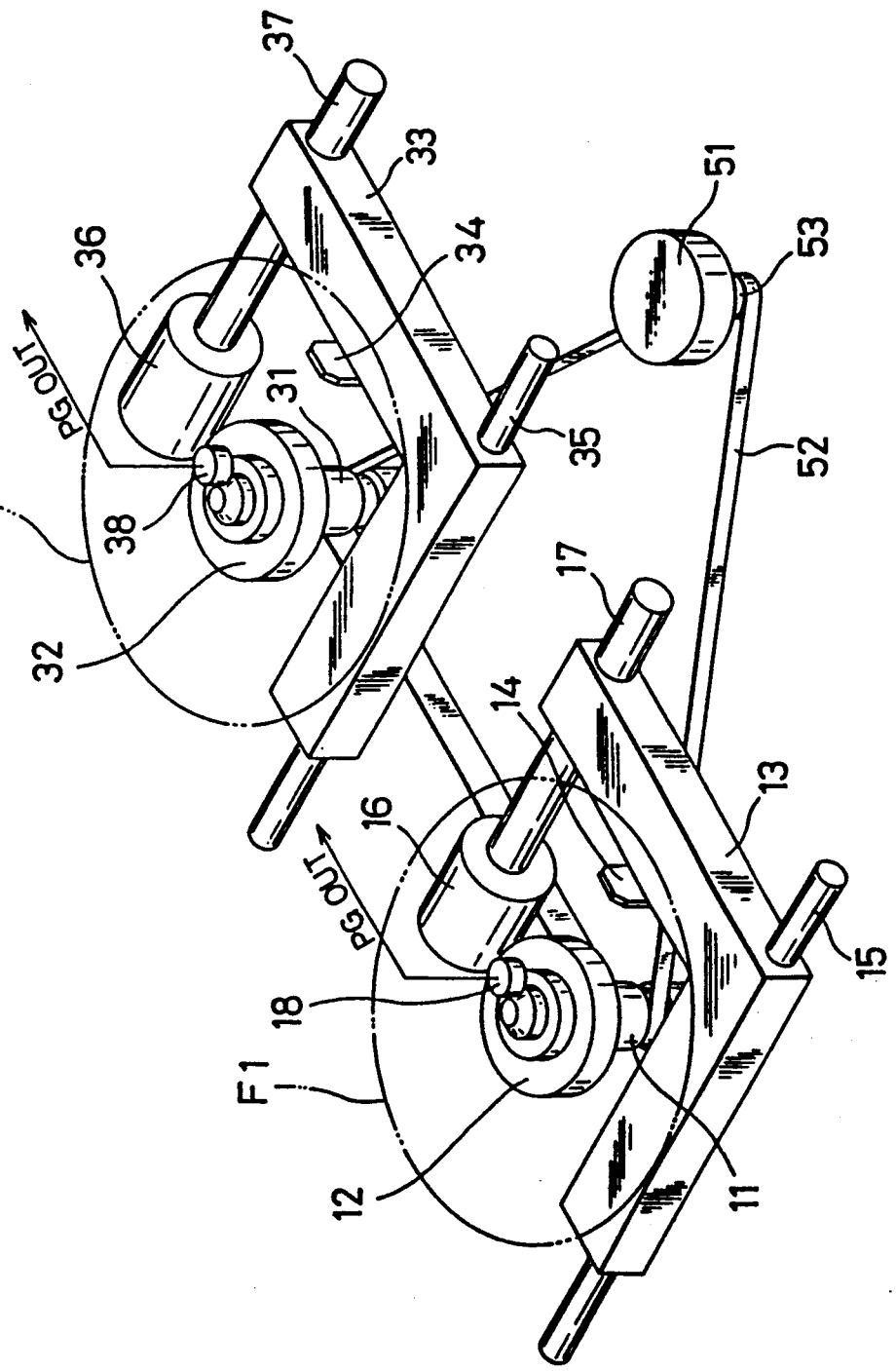
FIG. 1 is a perspective view showing a disk drive device of an embodiment of a present invention.

The present invention will now be described with reference to embodiments shown in the drawings.

FIG. 1 shows a disk drive device of an embodiment of the present invention. In this embodiment, the disk drive device is constructed in such a manner that two disks F1 and F2 are driven so that video signals recorded on the magnetic disk F1 are dubbed onto the other magnetic disk F2. The magnetic disk F1 on which video signals have been recorded is set to a reproducing deck of the device, and the magnetic disk F2 on which the video signals are to be recorded is set to a recording deck of the device. Since the reproducing deck and the recording deck have basically the same construction, only the construction of the reproducing deck is described in detail below. The construction of the recording deck is shown by reference numerals which are each the same as the sum of each of the reference numerals plus 20 of corresponding portions of the reproducing deck, e.g., 16 becomes 36, etc.

The device is provided with two bearing mechanisms 11 and 31 whereby two magnetic disks F1 and F2 are rotated. The bearing mechanism 11 rotatably supports a spindle chuck 12, which is provided for hooding and rotating the disk F1. A carriage 13 is provided with a magnetic head 14, and is slidably supported by a guide bar 15, to be able to move and to and fro along the guide bar 15, parallel with the guide bar 15, and rotates the lead screw 17 to a step motor 16 is provided with a lead screw 17 extending in move the carriage 13 so that the magnetic head 14 is positioned at a predetermined position on the disk F1. A PG 18 is provided for outputting a PG pulse for sensing a rotational position of the disk F1.

In this embodiment, a single spindle motor 51 is provided for rotating the two disks F1 and F2, and an endless belt 52 is wound around a pulley 53 fixed to an output shaft of the spindle motor 51 and rotatable shafts (described later in detail) of the bearing mechanisms 11 and 31, whereby a rotation of the pulley 53 is transmitted to the rotatable shafts through the belt 52.

Figure 2:
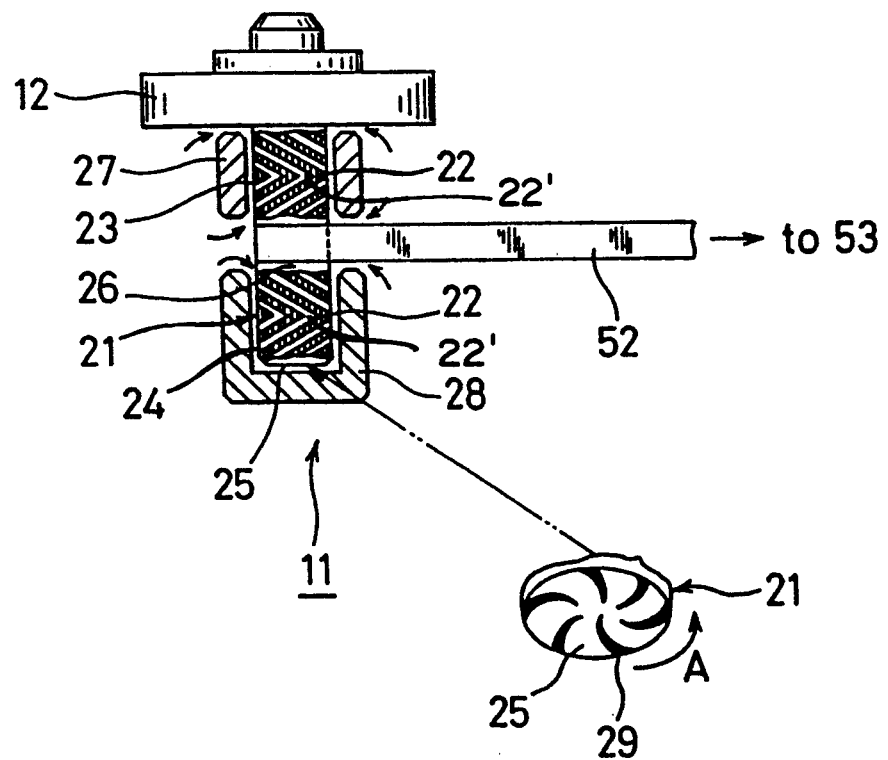
FIG. 2 is a sectional view of bearing mechanism.

FIG. 2 shows a construction of the bearing mechanism 11 in detail.

A rotatable shaft 21 is connected to the under surface of the spindle check 12, and is extended downward therefrom and perpendicular to the plane of the magnetic disk F1; the rotational axis of the rotatable shaft 21 being coaxial with that of the spindle chuck 12. Grooves 22 are formed on an upper outer surface 23 and a lower outer surface 24 of the rotatable shaft 21, and grooves 29 are formed on a lower end surface 25 thereof. The grooves 22 and 29 generate a pumping effect by which the rotatable shaft 21 is rotatably supported, substantially without friction, by bearing members 27 and 28, as described later. The middle portion of the rotatable shaft 21 has a cylindrical outer surface 26 on which the grooves 22 are not formed, and the belt 52 is wound around this cylindrical outer surface 26 of the rotatable shaft 21.

The bearing member 27 is formed as a tube and is loosely fitted to the rotatable shaft 21, and an inner surface of the bearing member 27 faces the upper outer surface 23 of the rotatable shaft 21 in such a manner that a gap is formed between that inner surface and the upper outer surface 23. The bearing member 28 is formed as a tube having a bottom, and is also loosely fitted to the rotatable shaft 21 in such a manner that a gap is formed between the inner surface thereof and the surfaces 24 and 25. The bearing mechanism 31 of the recording deck has the same construction as that of the bearing mechanism 11 of the reproducing deck.

The grooves 22 are formed in a herringbone shape having the peak portions 22' thereof facing to the right in FIG. 2. In this embodiment, the rotatable shaft 21 rotates clockwise (when viewed from above and, therefore, due to a rotation of the rotatable shaft 21, air enters the grooves 22 and is discharged from the peak portions of the herringbone. On the other hand, the grooves 29 in the lower end surface 25 are formed in a spiral shape, so that, due to a rotation of the rotatable shaft 21 as shown by an arrow A, air flow into the grooves 29 from outer end portions thereof and flow out from portions close to the axis of the shaft 21. Therefore, air or fluid flows into the bearing members 27 and 28 to generate a dynamic pressure, and accordingly, a pumping effect, by which the rotatable shaft 21 is supported in the bearing members 27 and 28 substantially without friction.

FIG. 3 and 4 show a construction of the central portion of the magnetic disk F1 or F2, wherein a hub 61 is disposed approximately at the center of the disk F1 and is provided with a PG yoke 62 at a predetermined position. The PG yoke 62 is fixed to the hub 61 so that, when the magnetic disk F1 is mounted on the spindle chuck 12, an orion core 18a provided at the PG coil 18 faces the PG yoke 62.

Figure 5:
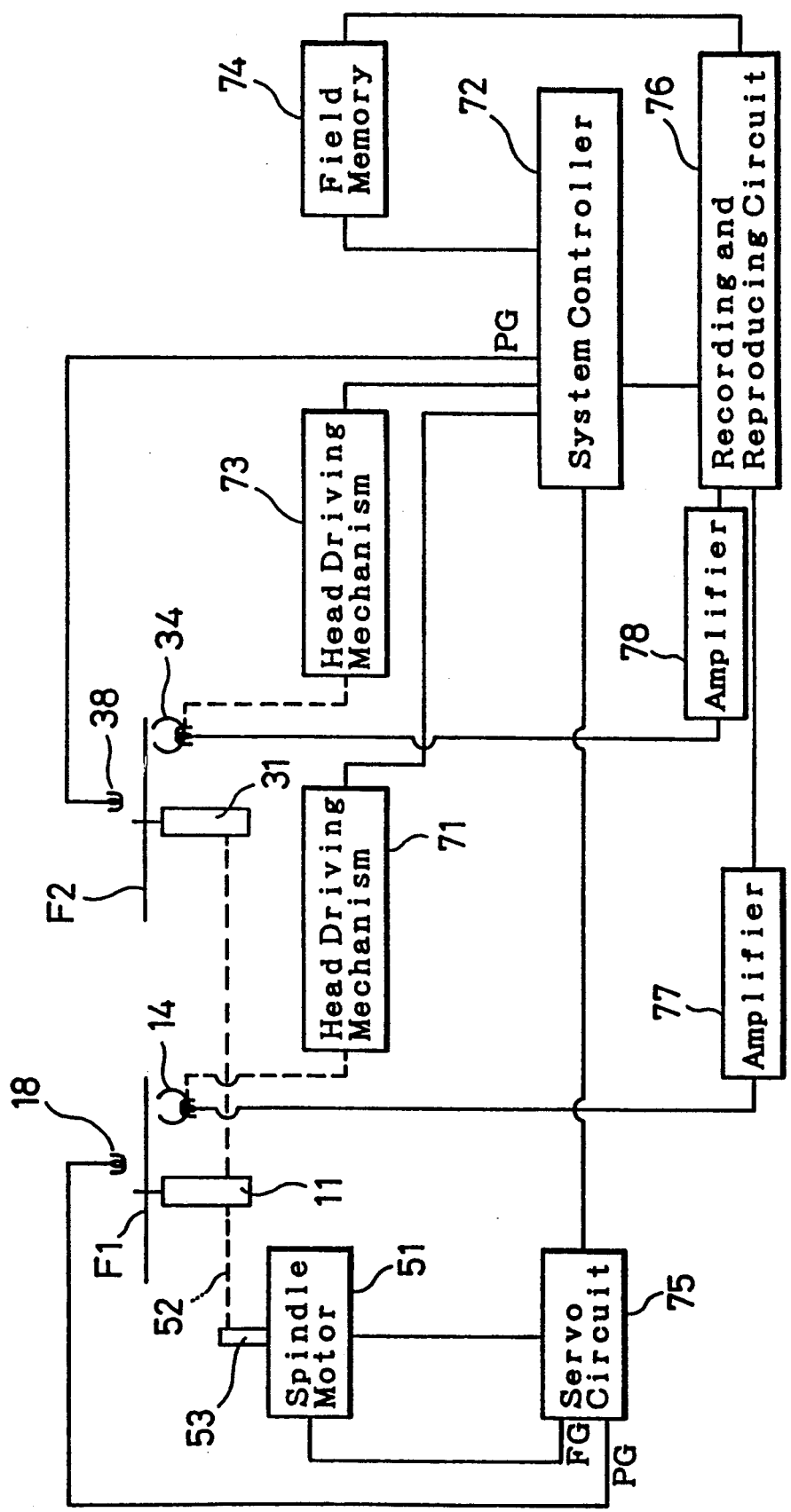
FIG. 5 is a block diagram showing a construction of a dubbing unit to which the disk drive device according to the present invention is applied.

FIG. 5 is a block diagram showing a construction of an embodiment of a dubbing unit to which the disk drive device according to the present invention is applied.

A head driving mechanism 71 includes (referring to FIG. 1) the step motor 16, the lead screw 17, the carriage 13, and the guide bar 15, and is controlled by a system controller 72 which is composed of, for example, a micro-computer etc. Similarly, a head driving mechanism 73 includes (referring to FIG. 1) the step motor 36, the lead screw 37, the carriage 33, and the guide bar 35, and is also controlled by the system controller 72.

A field memory 74 is provided for storing video signals and is connected to the system controller 72. A servo circuit 75 is connected to the spindle motor 51 and the PG coil 18 to control a rotation of the spindle motor 51, a projected image recording and reproducing circuit 76 is connected to the magnetic heads 14 and 34 through amplifiers 77 and 78, respectively, and is controlled by the system controller 72 to modulate and output video signals to the magnetic heads 14 and 34. The projected image recording and reproducing circuit 76 received, through the amplifiers 77 and 78, video signals generated by the magnetic heads 14 and 34, and demodulates the video signals, which are then stored in the field memory 74, if necessary.

The operation of this embodiment of the present invention is described below.

When a command is outputted to start a dubbing operation, the system controller 72 drives the spindle motor 51 through the servo circuit 75, whereby the pulley 53 of the spindle motor 51 is rotated. The rotation of the pulley 53 is transmitted to the rotatable shafts of the spindle chucks 12 and 32 through the belt 52, and accordingly, the spindle chucks 12 and 32, and the magnetic disks F1 and F2 disposed on and held by the spindle chucks 12 and 32, are rotated.

When the rotatable shaft 21 is rotated, the pumping effect as described above is generated. Namely, since the rotatable shaft 21 is provided with the grooves 22 and 29, while the rotatable shaft 21 is rotated, air flows into a gap between the roatatable shaft 21 and the bearing members 27 and 28, as shown by arrows in FIG. 2, so that the rotatable shaft 21 is held in a two-contact state with regard to the bearing members 27 and, this is, the rotatable shaft 21 is supported in the bearing members 27 and 28, substantially without friction between the rotatable shaft 21 and the bearing members 27 and 28, and as a result, the rotation of the rotatable shaft 21 is very smooth.

Note that, to reduce any frictional resistance between the rotatable shaft 21 and the bearing members 27 and 28, a lubricant such as grease, oil and the like may be filled in the gap therebetween.

Further note that, since the belt 52 is wound around the cylindrical outer surface 26 formed at approximately the middle portion of the rotatable shaft 21, the pumping effects generated by the grooves 22 formed on the upper outer surface 23 and the grooves 22 formed on the lower outer surface 24 are balanced, and thus an inclination of the rotatable shaft 21 toward a direction in which the rotatable shaft 21 is pulled (to the right in FIG. 2) is prevented.

The PG coil 18 senses the PG yoke 62 of the magnetic disk F1, and outputs one PG pulse per one revolution of the magnetic disk F1. The spindle motor 51 houses a pulse generator (not shown) which generates PG pulses having a frequency corresponding to the rotational speed of the motor. The servo circuit 75 compares the PG pulse and the PG pulses with a predetermined standard pulse, to obtain an error signal denoting the difference among these pulses, and controls the rotation of the spindle motor 51 in accordance with the error signal, and thus the spindle motor 51 and the magnetic disks F1 and F2 are rotated at a predetermined speed (for example, one revolution per one field).

The system controller 72 controls the head driving mechanism 71 so that the step motor 16 is driven and the lead screw 17 is rotated, and accordingly, the carriage 13 is guided by the guide bars 15 so that the magnetic head 14 is moved to a position at which it faces a predetermined track of the magnetic disk F1 on which video signals to be dubbed to another magnetic disc F2 have been recorded. The system controller 72 reproduces video signals of one field recorded on the magnetic disk F1, based on the PG pulse, and these video signals are inputted to the projected image recording and reproducing circuit 76 through the amplifier 77, demodulated, and stored in the field memory 74.

The magnetic head 34 is controlled by the system controlling 72 through the head driving mechanism 73, to be moved to a position at which the magnetic head 34 faces a track in which the video signals are to be recorded. The system controller 72 reads the video signals of one field stored in the field memory 74, and supplies those video signals to the projected image recording and reproducing circuit 76 to be modulated. Then, based on the PG pulse outputted by the PG coil 38, the modulated video signals are supplied to the magnetic head 34 through the amplifier 78 and recorded on the magnetic disk F2.

Thereafter, in the same way as described above, video signals recorded on a track of one magnetic disk are recorded or dubbed onto a predetermined track of the other magnetic disk, in sequence.

If wow or flutter occur during the rotation of the spindle motor 51, this is transmitted to both the spindle chuck 12 of the reproducing deck and the spindle chuck 32 of the recording deck, which are rotated in synchronization with each other. Therefore, if a slight jitter exist in a recorded condition of the magnetic disk F1 of the reproducing deck, the recorded condition of magnetic field F2 of the recording deck also contains a slight jitter.

Note that, although the bearing mechanism having dynamic pressure grooves are disposed under the spindle chucks in the above embodiment, in another embodiments other bearing mechanisms generating dynamic pressures can be used. Further, the number of magnetic disks driven by the device may be more than or equal to 3.

Although in the above embodiment the disk drive device of the present invention is applied to a magnetic disk dubbing unit, the disk rive device of the present invention can be applied to other types of units.

Further, although the embodiment of the present invention have been described herein with reference to the accompanying drawings, obviously many modifications and changes may be made by those skilled in this art without departing from the scope of the invention.

I claim:

1. A device for driving a plurality of disks, said device comprising:
    means for supporting said plurality of disks, said supporting means including a plurality of bearing mechanisms, each bearing mechanism respectively and individually rotatably supporting at least one of said plurality of disks;
    a single motor;
    means for transmitting a rotation of said motor to at least two of said bearing mechanisms, said transmitting means comprising an endless belt; and
    wherein each of said bearing mechanisms comprises a tubular bearing member, a rotatable shaft being operatively connected to one of said disks and being rotatably supported in said tubular bearing member, said rotatable shaft having first and second ends and an outer surface, the diameter of said shaft being substantially uniform between said first and second ends, and each said rotatable shaft having a contacting portion formed on said outer surface of said shaft at a middle portion thereof, said endless belt being wound around said contacting portion.

2. A device according to claim 1, wherein said outer surface of said rotatable shaft includes grooves, whereby a fluid flows through said grooves to thereby generate a pumping effect so that said rotatable shaft is supported in said tubular bearing member substantially without friction therebetween.

3. A device according to claim 2, wherein said grooves are formed in a herringbone shape on said outer surface of said rotatable shaft, whereby a fluid is discharged from peak points of the herringbone shaped grooves due to a rotation of said rotatable shaft to thereby generate said pumping effect.

4. A device according to claim 2, wherein said tubular bearing member has a bottom, and said rotatable shaft has a lower end surface facing said bottom, said lower end surface being provided with spiral grooves to generate said pumping effect so that said rotatable shaft is supported in said tubular bearing member substantially without friction therebetween.

5. A device for driving a plurality of disks, said device comprising:
    a plurality of spindle chucks for respectively and individually holding each of said plurality of disks;
    a plurality of bearing mechanisms, each bearing mechanism respectively and individually rotatably supporting at least one of said plurality of spindle chucks, each of said bearing mechanisms comprising a tubular bearing member, a rotatable shaft being connected to one of said disks and being rotatably supported in said tubular bearing member, said rotatable shaft having first and second ends and an outer surface, the diameter of said shaft being substantially uniform between said first and second ends;
    a single motor;
    means for transmitting a rotation of said motor to at least two of said spindle chucks, said transmitting means comprising an endless belt; and
    wherein each said rotatable shaft includes a contacting portion formed on said outer surface of said shaft at a middle portion thereof, said endless belt being wound around said contacting portion.

6. A device for driving a plurality of disks, said device comprising:
    a plurality of spindle chucks for respectively and individually rotating each of said plurality of disks;
    a plurality of bearing mechanisms, each bearing mechanism respectively and individually rotatably supporting at least one of said plurality of spindle chucks, said bearing mechanisms generating a dynamic pressure by which said spindle chucks are rotatably supported, each of said bearing mechanisms comprising a tubular bearing member, a rotatable shaft being connected to one of said disks and being rotatably supported in said tubular bearing member, said rotatable shaft having first and second ends and an outer surface, the diameter of said shaft being substantially uniform between said first and second ends;

a single motor;

means for transmitting a rotation of said motor to at least two of said plurality of spindle chucks, said transmitting means comprising an endless belt; and wherein each said rotatable shaft includes a contacting portion formed on said outer surface of said shaft at a middle portion thereof, said endless belt being wound around said contacting portion.

7. A device for dubbing signals recorded on a first magnetic disk onto a second magnetic disk, said device comprising:

means for supporting said first and second disks, said supporting means including a plurality of bearing mechanisms, each bearing mechanism individually rotatably supporting a respective said first and second disks, each of said bearing mechanisms comprising a tubular bearing member, a rotatable shaft being connected to a respective one of said first and second disks, said rotatable shaft being rotatably supported in said tubular bearing member, said rotatable shaft having first and second ends and an outer surface, the diameter of said shaft being substantially uniform between said first and second ends;

a single motor;

means for transmitting a rotation of said motor to said bearing mechanisms, said transmitting means comprising an endless belt, wherein each said rotatable shaft includes a contacting portion formed on said outer surface of said shaft at a middle portion thereof, said endless belt being wound around said contacting portion;

means for reproducing signals recorded on said first magnetic disk; and means for inputting the reproduced signals to said second magnetic disk.

* * * * *